ized Aug. 18, 1959

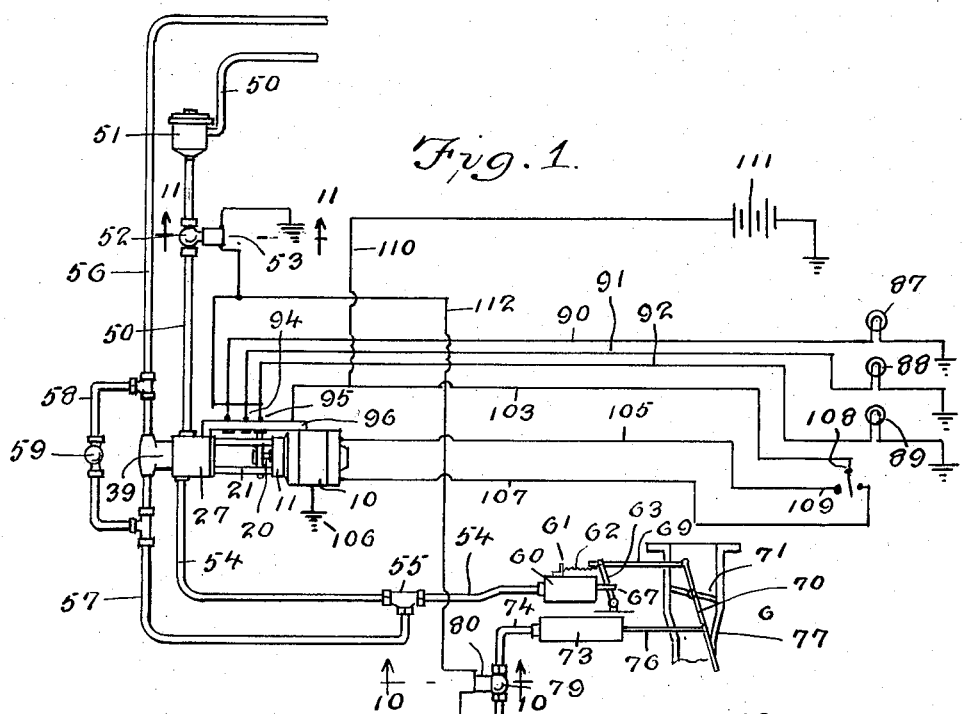
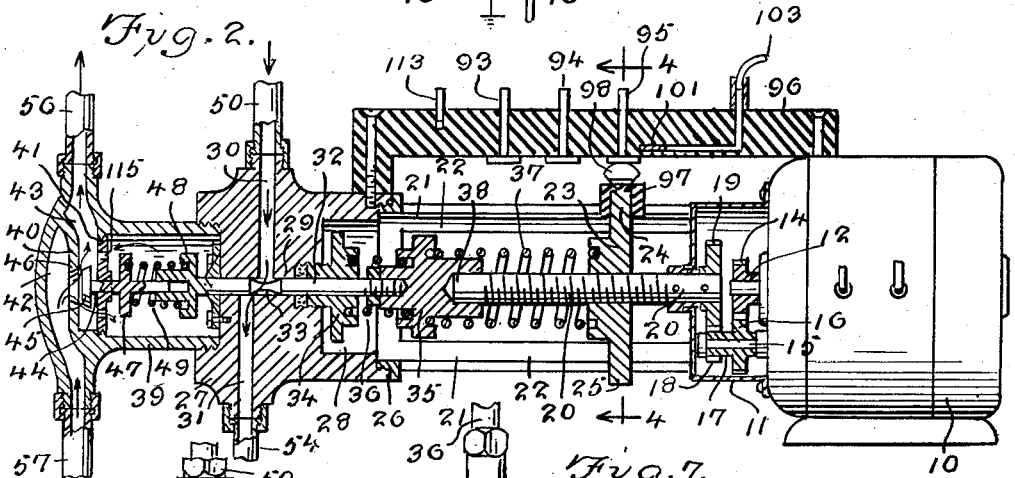
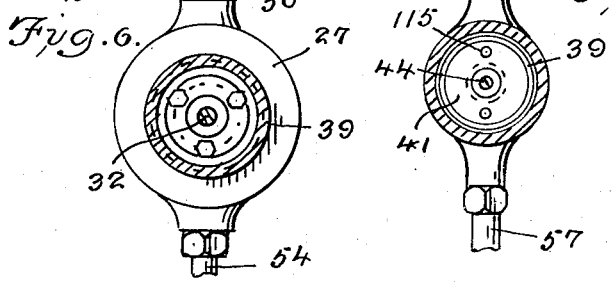

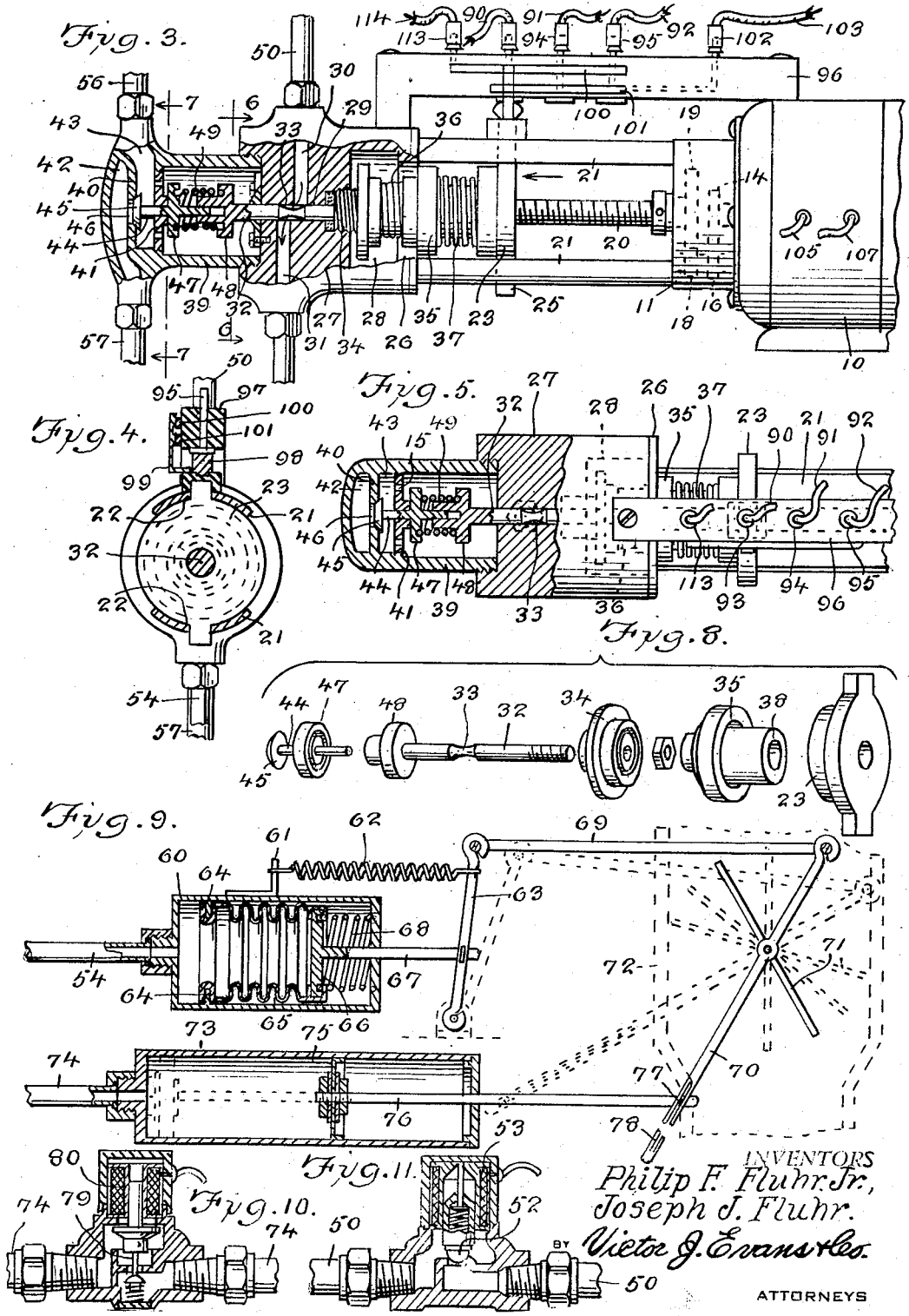

2,899,947

AUTOMATIC SELECTIVE VARIABLE SPEED
CONTROL FOR VEHICLES

Philip F. Fluhr, Jr., and Joseph J. Fluhr, Melville, N.Y.

Application May 27, 1955, Serial No. 511,654

3 Claims. (Cl. 123—99)

This invention relates to a vehicle, and more particularly to an automatic speed control mechanism for a vehicle such as an automobile or truck.

The object of the invention is to provide an automatic selective variable speed control for vehicles wherein the mechanism includes an auxiliary or secondary valve in the fuel supply line whereby the vehicle can be safely maintained at any desired speed.

Another object of the invention is to provide an automatic selective variable speed control mechanism which permits the operator of the vehicle, from his position in the driver's seat, to maintain the vehicle at any desired speed and whereby there will be no interference with normal operation of the vehicle, and wherein the speed of the vehicle will be controlled automatically and uniformly since the speed can be maintained uniform or constant regardless of the terrain being traveled.

A further object of the invention is to provide a vehicle speed control mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a schematic showing of the speed control mechanism of the present invention, showing the wiring diagram and conduits for the mechanism.

Figure 2 is an elevational view of the governor pilot, with parts broken away and in section.

Figure 3 is a view similar to Figure 2, but showing the valves and associated parts in a different position.

Figure 4 is a sectional view taken on the line 4—4 of Figure 2.

Figure 5 is a fragmentary top plan view of the governor pilot, with parts broken away and in section.

Figure 6 is a sectional view taken on the line 6—6 of Figure 3.

Figure 7 is a sectional view taken on the line 7—7 of Figure 3.

Figure 8 is a fragmentary perspective exploded view showing certain parts of the governor pilot.

Figure 9 is a longitudinal sectional view showing the linkage control for the auxiliary butterfly valve in the fuel supply line.

Figure 10 is a sectional view showing one of the solenoid valves, and taken on the line 10—10 of Figure 1.

Figure 11 is a sectional view taken on the line 11—11 of Figure 1.

Referring in detail to the drawings, the numeral 10 designates a conventional electric motor, Figure 2, and arranged contiguous to an end of the motor 10 is a hollow casing 11. Projecting from the motor 10 and driven thereby is a drive shaft 12 which has a first gear 14 mounted thereon. The gear 14 meshes with a gear section 16 which forms part of a gear member 17, and the gear member 17 is mounted on a stub shaft 15. The gear member 17 further includes a gear section 18 which meshes with a gear 19 which is secured to an end of the driven shaft 20.

Extending from the casing 11 and secured thereto is a pair of spaced parallel curved plates 21 and each of the plates 21 is provided with a longitudinally extending slot 22. A block 23 is slidably or movably mounted between the pair of plates 21, and the block 23 threadedly engages the threaded portion 29 of the driven shaft 20. The block 23 includes a pair of diametrically opposed fingers 24 and 25 and these fingers extend through the slots 22. Thus, as the motor 10 is energized, the driven shaft 20 will be rotated due to the previously described gearing arranged in the casing 11, and this rotation of the shaft 20 will result in longitudinal shifting of the block 23 through the space between the pair of plates 21.

A threaded ring or collar 26 is formed on the ends of the plates 21, and a base 27 is arranged in threaded engagement with the ring 26. The base 27 is provided with an interior chamber 28 for a purpose to be later described.

Extending through the base 27 is a bore 29, and the base further includes a first passageway 30 and a second passageway 31, and these passageways are arranged offset with respect to each other. A stem 32 is slidably mounted in the bore 29, and the stem 32 includes an intermediate reduced diameter portion 33 which defines a valve, and the valve 33 is adapted to establish contact between the pair of passages 30 and 31, as shown in Figures 2 and 3. A packing nut 34 surrounds a portion of the stem 32 and the stem 32 has an end arranged in threaded engagement with a body member 35 which is movably mounted between the pair of plates 21. A first coil spring 36 is circumposed on the stem 32, and the coil spring 36 is interposed between the packing nut 34 and the body member 35. A second coil spring 37 is interposed between the body member 35 and the block 23, and the body member 35 is provided with a socket 38 in which projects an end of the driven shaft 20.

Extending from the base 27 and connected thereto or formed integral therewith is a casing 39 which includes an inner partition 40 that defines a pair of compartments 42 and 43. A wall 41 is also arranged interiorly of the casing 39 and a shank 44 is slidably mounted in the wall 41. The shank 44 carries a valve or disc 45 which is mounted for movement into and out of closing relation with respect to an aperture or valve seat 46 in the partition 40. The shank 44 carries an annular flange 47, and an end of the shank 44 slidably engages a socket which is formed in the adjacent end of the stem 32. An annular lip 48 is formed on the stem 32, and a coil spring 49 is interposed between the flange 47 and lip 48 for normally urging the valve 45 into closing relation with respect to the aperture 46.

The present invention further includes a first conduit 50 which may have a filter or strainer 51 therein whereby impurities will be removed from the oil or other fluid medium, and the conduit 50 may be connected to a suitable source of supply of oil or other fluid in the vehicle. The conduit 50 also has a valve 52 therein which is operated by a solenoid 53, and the conduit 50 communicates with the passageway 30 in the base 27. Communicating with the other passage 31 is a conduit 54 which may have a T-fitting 55 therein, Figure 1. The compartment 43 has a return or exhaust conduit 56 connected thereto, and a conduit 57 is connected to the other compartment 42 in the casing 39, and the conduit 57 leads to the T-fitting 55. A bypass line 58 interconnects the conduits 56 and 57 together, and the bypass line 58 may have a relief valve 59 therein so that in the event excess pressure builds up in the system, the relief valve 59 acts as a safety to prevent damage to the parts.

The conduit 54 communicates with the interior of a housing 60, and secured to the housing 60 or formed integral therewith is a lug 61 which has a return spring 62 connected thereto. The spring 62 is also connected to a link 63. Arranged interiorly of the housing 60 is a flange 64 which has a flexible bellows or diaphragm 65 connected thereto, and the bellows 65 is also connected to a movable plunger 66 which has a rod 67 secured thereto, Fig. 9. A coil spring 68 is interposed between the plunger 66 and the adjacent end of the housing 60, and a lever 69 has one end pivotally connected to the link 63 while the other end of the lever 69 is pivotally connected to a bar 70 which extends into the fuel line 72 which leads to the vehicle carburetor. A butterfly valve 71 is movably mounted in the fuel supply line 72, and the butterfly valve 71 is secured to the bar 70 so that as the bar 70 is shifted, the valve 71 will be moved into and out of its closed positions whereby the amount of gasoline or other fuel flowing through the line 72 will be controlled, so that the speed of the vehicle can be automatically regulated.

Spaced from the housing 60 is a tube 73, Figure 9, and a conduit 74 which may be an air line, communicates with the interior of the tube 73. A plunger 75 is movably mounted in the tube 73, and a rod 76 is secured to the plunger 75. The rod 76 carries a pin 77 which is movably mounted in a slot 78 in the bar 70.

Interposed in the conduit 74 is a valve 79 which is operated by a solenoid 80. The construction of the solenoids and valves is illustrated in detail in Figures 10 and 11 and these valves may include a movable plunger that is mounted for movement into and out of closing relation with respect to the passageway which is formed in the valve.

The present invention further includes a plurality of light bulbs 87, 88, and 89 which are adapted to be mounted on or adjacent to the vehicle dashboard. Wires 90, 91 and 92 lead from these bulbs to spaced apart terminals, which are indicated by the numerals 93, 94 and 95. These terminals may have heads on their lower ends as shown in Figure 2, and the terminals are mounted in an insulated bracket 96 which may be secured to the motor 10 and to the base 27. Mounted on the finger 24 of the block 23 is an insulated bushing 97 which carries a movable contact 98. The contact 98 is mounted for movement into and out of engagement with the heads on the lower ends of the terminals 93, 94 and 95 for a purpose to be later described. Secured to the contact 98 is an L-shaped arm 99, Figure 4, and secured to one side of the bracket 96 is a pair of conductor strips 100 and 101, Figure 3. A terminal 102 is connected electrically to the strip 101, and a wire 103 leads from the terminal 102 to a wire 105 and the wire 105 leads to the motor 10 and the motor 10 may be grounded as at 106, Figure 1. A second wire 107 also leads from the motor 10 to a switch 108, and a branch wire 109 connects the switch 108 to the wire 103. A wire 110 leads from the wire 103 to a suitable source of electrical energy such as the vehicle battery 111. A wire 112 connects the pair of solenoids 53 and 80 to the wires 90, 91 and 92, and a wire 114 leads from the terminal 113, and the terminal 113 is electrically connected to the strip 100.

From the foregoing it is apparent that there has been provided an automatic selective variable speed control for vehicles such as automobiles or trucks. The wall 40 in the casing 39 may be provided with a plurality of apertures 115 whereby oil can pass through these apertures in order to establish equilibrium. The vacuum tube 73 having the plunger 75 therein can be used for neutralizing the pilot linkage, and the bellows 65 in the housing 60 serves to control the linkage which leads to the butterfly valve 71. The conduit 56 leads from the governor pilot back to the engine crankcase, and the conduit 50 serves to convey oil or other fluid from the lubricating oil pump. The conduit 57 is a return line, and the conduit 54 leads to the bellows housing 60. The motor 10 is preferably of a low voltage, low speed type, and the casing 11 has the reduction gears arranged therein. The spring 62 is a return spring and serves to normally urge the valve 71 to its closed position so as to normally block the flow of fuel through the pipe 72. The spring 49 may act as a pressure relief member. The bulb 87 indicates high speed, while the bulb 88 indicates medium speed and the bulb 89 indicates low speed. The switch 108 is a governor on and off switch. The pipe 72 may be part of the vehicle carburetor. A small gear pump or other suitable pump can be used for supplying oil from the crankcase through the conduit 50 to the various parts of the mechanism. With the present invention speed of the vehicle can be maintained constant regardless of whether the vehicle is going up a hill or down a hill or whether it is traveling along a level surface.

In use the operator of the vehicle can operate the governing arrangement while sitting in the driver's seat so as to maintain the highest desired speed, and there will be no interference with normal operation of the vehicle below that of the highest speed to be maintained. The accelerator pedal will be effective until the speed that the governor is set for is reached, and the accelerator pedal will become inoperative for any speed beyond that even though the accelerator pedal be pushed to the floor of the vehicle. The mechanism will control the speed of the vehicle automatically, and in crowded areas or in city limits where a strict speed limit is enforced, the operator can keep a more careful observation of his position without the necessity of glancing at the speedometer to check his or her speed. Also, the device will give a more uniform speed on the road by maintaining the desired speed regardless of the terrain.

Initially the driven shaft 20 is caused to rotate due to the action of the reduction gears in the casing 11. As the shaft 20 rotates, the arm or block 23 will move along between the pair of plates 21 to thereby increase the tension on the three coil springs 37, 36, and 49. This increase in spring tension will permit the pilot valve orifice 33 to open an amount equal to the pressure needed for the throttling effect of the lubricating oil pressure from the lube oil pump and the size of these parts can be varied as desired. Also, the tension on the return valve spring will be increased so that a constant pressure will be maintained throughout the oil lines or conduits from the pilot valve orifice 33 to the return valve 45 and this will insure that there will be uniform pressure on the bellows linkage control as shown in Figure 9. As the block 23 moves along the shaft 20, the contact 98 will engage the heads on the lower ends of the terminals 93, 94 and 95. This will cause the pair of solenoid valves 52 and 79 to be energized. Thus, the solenoid valve 52 will open initially to permit lubricating oil from the lubricating oil pump of the engine to flow through the conduit 50 to the governor pilot and through the variable speed control arrangement. Then, the solenoid valve 79 will close and this will cause the vacuum in the cylinder 73 to be broken to permit the linkage to become actuated by the linkage control housing 60. The vacuum plunger cylinder 73 maintains the secondary or auxiliary valve 71 on the carburetor in a wide open position when the governor arrangement is not energized. The low speed light 89 on the dashboard will glow to indicate that the first or low speed position of the governor has been reached and at this point the governor pilot motor 10 is stopped from rotating so that the vehicle is now in a position to have its speed automatically controlled. To take the vehicle out of automatic control, it is only necessary to press the off governor switch 108 until all of the dashboard pilot lights are off.

Each of the three springs 49, 36 and 37 in the governor pilot has a different tension and this serves to maintain a pressure differential between the lube oil pump and the governor arrangement. The outlet valve spring 49 permits an accurate metering effect to control this differential as a regulator. The inlet orifice 33 permits a certain quantity of oil, at a high velocity to enter the governing conduits and assembly units to thereby insure that there will be a constant flow of oil through the units and the velocity of this oil is controlled by the valve opening. The relief valve 59 is connected across the conduits 56 and 57 to serve as a safety whereby the relief valve will open in the event that excess pressures build up. The auxiliary valve 71 on the carburetor is installed before the regular valve on the carburetor to insure that the action of the governor pilot is the controlling factor. The secondary or auxiliary valve 70 is connected through the linkage shown in Figure 9 to the bellows diaphragm 65 and to the vacuum plunger 75.

The spring 49 acts as a safety spring and keeps a variable pressure due to the actuation of the shaft 32 on the disc 47 to thereby vary the return pressure of the oil through the aperture 46 which is set in the throttling return valve.

The conventional accelerator pedal is always used and is effective, but will become ineffective after the person has reached the speed that the automatic selective variable speed control is set for, even though the accelerator pedal be pushed down to the floor board. The butterfly valve 70, through its working mechanism, will be the controlling speed factor after the speed of the control has been set. The opening 115 in the wall 41 permits an equalized oil pressure between the aperture 43 which is the return side of the throttling return valve, and the housing of the spring 49 with its related parts. The motor 10 is a reversible low speed motor, and the pipe line 74 is connected to the vacuum or low pressure side of the engine in the same manner as the windshield wiper is connected to the carburetor. The pilot valve orifice which is referred to as the reduced portion 33 functions as follows. As the spring tension is increased on the springs 37 and 36 through the movement of the arm 23, the pilot valve 33 will open a coresponding amount, depending upon the amount of tension on the springs 36 and 37. This permits an increased amount of oil to flow and pressure to be built up in the aperture 31 and the related parts back through the aperture and passage 42 of the throttling return valve 45 in the housing 39.

The operation of the present invention is as follows. As the arm 23 moves along the shaft 29, it engages the electrical contacts 95, 100 and 101 through the finger 98. The contact 95 will energize the first speed light which is for low speed. The contacts 100 and 101 will then cause the solenoids 80 and 53 to be energized. In this first position the spring 37 puts a tension on the plate 35 which has a retarding tension placed on it by the spring 36. These springs 36 and 37 therefore limit the amount of travel of the shaft 32 which holds the pilot valve 33. In this position the pilot valve 33 will open an amount great enough to permit the opening of the butterfly valve 71 for the lowest speed desired. This opening of the pilot valve 33 in the orifice 30 to 31 will permit an appreciable amount of oil to pass through and thereby build up pressure from the motor lubricating oil pump. The passage of oil from the oil pump is as follows: the oil goes from the pump through the line 50, strainer 51, solenoid valve 52, orifices 30 and 31, lines 54, 55 and 57, throttling return valve 39, and then back to the motor crank case, and the oil from the pump passes through the lines 54 and 57. This in turn actuates the pressure diaphragm 65 which causes the butterfly valve 71 to open through the medium of the linkage 70, 69, 63 and 67.

When the pressure acting on the diaphragm 65 is at the first speed peak pressure, the oil will then return to the motor crank case through the throttling return valve 39 which limits and maintains constant the actuating oil pressure since it acts as a regulating valve. The throttling return valve 39 is controlled by the movement of the shaft 32 acting on the spring 49 which keeps the throttling tension on the valve 35 and plate 37. The shaft 32 is connected to the plate 35 as one unit so as to govern the tension placed on the springs 36 and 49. Thus, there will be maintained equalized pressure throughout the whole unit both in the spring tension which acts thereon and by means of the oil pressure from the orifice channel 31 to the throttling return valve chamber 42.

As the solenoids 53 and 80 are energized, they will remain energized as long as the speed control of the present invention is in use. The solenoid 53 will open the oil passage 50 from the motor lubricating oil pump to the pilot valve unit. The solenoid 80 will close the cylinder 73 and the plunger 75 to thereby close off the vacuum from the engine to permit the diaphragm 65 in the cylinder 60 of the speed control unit to become effective.

As the butterfly valve 70 is now set, the speed of the motor will be governed at this point and will be allowed to go no further, the valve 71 being an auxiliary valve and not the main carburetor valve. This is so even though the accelerator pedal of the vehicle be pushed down to the floor board to actuate the main butterfly valve of the carburetor.

In the next position of the arm 23, contact 94 in conjunction with members 100 and 101 is made. The only difference is that in this second speed more pressure from the lubricating oil pump of the motor is desired for the controlling system so that the butterfly valve 71 is open to take care of the new speed. The same is true in the next speed position when contact is made with the member 93. For each increase in speed an increase of oil pressure is desired in the controlling system through the further opening of the orifices 31 and 30 by movement of the pilot valve 33 and this in turn actuates the butterfly valve 71 further to take care of the newly desired speed.

To raise or lower the speed of the vehicle by using the automatic speed control, the switch 108 will cause the movement of the motor 10 in the direction desired. The motor 10 is of the reverse slow speed type, and reversing is done by means of the switch 108 to turn the automatic system off, it is only necessary to bring the arm 23 back to the neutral position. The unit is de-energized when the arm 23 is brought back to the neutral position.

The solenoid valves 52 and 79 work opposite to each other. When the unit is energized, the solenoid 53 will have its valve body open to the flow of oil whereby the solenoid 80 will have its valve closed. Both solenoid valves are energized at the same instant but work oppositely. In the event a slow speed motor is used, the gearing can be eliminated.

We claim:

1. In combination, a governor pilot including a motor, a casing arranged contiguous to said motor, plates extending from said casing, said plates having slots, a drive shaft extending from said motor, a first gear mounted on said drive shaft, a stub shaft positioned in said casing, a gear member mounted on said stub shaft and having a section meshing with said first gear, a driven shaft rotatably mounted between said plates, a second gear secured to said driven shaft and meshing with a second section of said gear member, a block movably mounted between said plates and threadedly engaging said driven shaft, fingers extending from said block and slidably projecting through said slots, a base connected to said plates and provided with a chamber, there being a first and second passageway in said base, a first conduit connected to said first passageway and a second conduit connected to said second passageway, there being a bore in said base interconnecting said passageways together, a stem slidably mounted in said bore and including an intermediate portion defining a valve mounted for movement into and out of registry with said passageways, a packing nut positioned in said chamber and surrounding said stem, a body member movably mounted between said plates and connected to said stem, a first coil spring interposed between said packing nut and body member, a second coil spring interposed between said body member and said block, a casing connected to said base and including compartments separated by a partition, a wall member spaced from said partition, a third and fourth conduit connected to said compartments, a fitting connecting said fourth conduit to said second conduit, there being an aperture in said partition, a disc mounted for movement into and out of closing relation with respect to said aperture, a shank connected to said disc and having a flange thereon, said stem being provided with a lip, a third coil spring interposed between said flange and lip, a valve member mounted in said first conduit, a first solenoid for operating said valve member, a housing connected to said second conduit, a plunger slidably mounted in said housing, a diaphragm positioned in said housing for actuating said plunger, a coil spring interposed between said plunger and the adjacent end of the housing, a rod extending from said plunger, a lug secured to said housing, a link pivotally connected to said rod, a coil spring extending between said lug and said link, a butterfly valve, a lever connecting said link to said butterfly valve, said diaphragm being actuated by the movement of the valve in said second conduit to control said butterfly valve to control the speed of a motor vehicle, a tube spaced from said housing, a vacuum line connected to said tube, a solenoid operated valve in said vacuum line, a plunger mounted in said tube, and a rod connecting said last named plunger to said bar.

2. The structure as defined in claim 1, and further including a bypass line interconnecting said third and fourth conduits together and having a pressure relief valve therein.

3. In an automatic selective variable speed control for vehicles, a pair of plates provided with longitudinally extending slots therein, a motor arranged contiguous to said plates, a driven shaft rotatably mounted between said pair of plates, a gear mechanism connecting said motor to said driven shaft whereby actuation of said motor will operate said shaft, a block movably mounted on said driven shaft and interposed between said pair of plates, a contact carried by said block, a plurality of terminals adapted to be selectively engaged by said contact, illumination means connected to said terminals and said illumination means adapted to be selectively actuated, and valve means arranged contiguous to said plates for controlling the flow of fluid through the speed control system.

References Cited in the file of this patent
UNITED STATES PATENTS

| | | |
|---|---|---|
| 2,224,600 | Howard | Dec. 10, 1940 |
| 2,260,576 | Maybach | Oct. 28, 1941 |
| 2,361,206 | Hoppe | Oct. 24, 1944 |
| 2,369,397 | Kostenick | Feb. 13, 1945 |
| 2,756,734 | Jorgensen | July 31, 1956 |
| 2,818,847 | Mock | Jan. 7, 1956 |